US011255319B2

United States Patent
Ko et al.

(10) Patent No.: US 11,255,319 B2
(45) Date of Patent: Feb. 22, 2022

(54) SHAFT-CYLINDER ASSEMBLY FOR HIGH TEMPERATURE OPERATION

(71) Applicant: Neo Mechanics Limited, Hong Kong (HK)

(72) Inventors: Stanley Moon Kai Ko, Hong Kong (HK); Kyong Tae Chang, Seoul (KR)

(73) Assignee: Neo Mechanics Limited, Hong Kong (HK)

( * ) Notice: Subject to any disclaimer, the term of this patent is extended or adjusted under 35 U.S.C. 154(b) by 78 days.

(21) Appl. No.: 16/297,653

(22) Filed: Mar. 9, 2019

(65) Prior Publication Data

US 2020/0284248 A1    Sep. 10, 2020

(51) Int. Cl.
*F04B 39/06*      (2006.01)
*F16J 15/16*      (2006.01)
(Continued)

(52) U.S. Cl.
CPC .......... *F04B 39/064* (2013.01); *F16J 15/162* (2013.01); *F04B 39/0246* (2013.01);
(Continued)

(58) Field of Classification Search
CPC ........ F16J 15/002; F16J 15/162; F16J 15/182; F16J 15/186; F16J 15/188; F16J 15/26;
(Continued)

(56) References Cited

U.S. PATENT DOCUMENTS 1,003,162 A * 9/1911 Thiel ........................ F16J 15/28
                                                  277/545
1,666,496 A * 4/1928 Jankus .................. F16K 41/026
                                                  137/248
(Continued)

FOREIGN PATENT DOCUMENTS

CN        101290280 A    10/2008
CN        201368651 Y    12/2009
(Continued)

OTHER PUBLICATIONS

International Search Report and Written Opinion of corresponding PCT Patent Application No. PCT/IB2020/051832 dated Jun. 15, 2020.

*Primary Examiner* — Nicholas L Foster
(74) *Attorney, Agent, or Firm* — Idea Intellectual Limited; Margaret A. Burke; Sam T. Yip (57) ABSTRACT

The present invention provides a shaft-cylinder assembly for high-temperature operation comprising a pair of first and second dynamic sealing members having a helical coiled seal ring structure configured to be in contact with the shaft for providing dynamic sealing function in the cylinder; and a cylindrical cooling jacket configured to circumferentially surround the dynamic sealing members such that a cavity is defined between the dynamic sealing members inside the cooling jacket; wherein the cooling jacket comprises one or more inflow cooling channels and one or more outflow cooling channels configured to communicating with the cavity and circulating a cooling fluid through the cavity for moving heat away from the dynamic sealing members.

4 Claims, 5 Drawing Sheets

(51) Int. Cl.
*F04B 39/04* (2006.01)
*F04B 53/16* (2006.01)
*F16J 15/18* (2006.01)
*F04B 39/02* (2006.01)

(52) U.S. Cl.
CPC ........... *F04B 39/041* (2013.01); *F04B 53/164* (2013.01); *F16J 15/182* (2013.01)

(58) Field of Classification Search
CPC .......... F16J 15/28; F16J 15/56; F04B 53/164; F04B 39/041; F04B 39/064; F04D 29/124; F04D 29/128
See application file for complete search history.

(56) References Cited

U.S. PATENT DOCUMENTS

| | | | | |
|---|---|---|---|---|
| 2,332,150 A * | 10/1943 | Huff | ...................... | F04D 29/108 277/513 |
| 2,730,386 A * | 1/1956 | Shields | .................. | F16J 15/183 277/513 |
| 2,910,007 A * | 10/1959 | Buri | ........................ | F04B 15/06 417/559 |
| 3,114,326 A * | 12/1963 | Yaindl | ..................... | F04B 53/08 417/567 |
| 3,147,982 A * | 9/1964 | Klein | ..................... | F16J 15/162 277/515 |
| 3,176,996 A * | 4/1965 | Barnett | .................. | B63H 23/36 277/318 |
| 3,542,374 A * | 11/1970 | Neilson | .................... | F16J 15/28 277/584 |
| 3,914,752 A * | 10/1975 | Howard | ................ | F04B 53/164 417/9 |
| 4,333,661 A * | 6/1982 | Merrell | ...................... | F16J 9/28 277/458 |
| 4,425,838 A | 1/1984 | Pippert | | |
| 4,844,479 A * | 7/1989 | Ueda | ...................... | F16J 15/162 277/520 |
| 5,873,575 A * | 2/1999 | Hanlon | .................... | F16J 15/26 277/512 |
| 6,932,351 B1 * | 8/2005 | Mowll | .................... | F04B 39/00 277/512 |
| 8,366,114 B1 * | 2/2013 | Gruner | ................... | F16J 15/182 277/329 |
| 8,627,758 B2 * | 1/2014 | Chang | .................... | F04B 1/2014 92/71 |
| 8,690,162 B2 * | 4/2014 | Chang | ................... | B63H 23/321 277/633 |
| 9,658,001 B2 * | 5/2017 | Gruner | ................... | F16J 15/182 |
| 10,364,891 B2 * | 7/2019 | Ko | ............................. | F16F 1/06 |
| 2008/0217864 A1 * | 9/2008 | Johnson | ................... | F16J 15/56 277/552 |
| 2012/0216673 A1 * | 8/2012 | Chang | ................... | F16J 15/3272 92/165 R |
| 2013/0014845 A1 * | 1/2013 | Chang | ................... | F16J 15/3272 137/625.69 |
| 2013/0017107 A1 * | 1/2013 | Chang | ................... | F04B 53/166 417/437 |
| 2013/0139999 A1 * | 6/2013 | Gruner | ................... | F16J 15/182 165/53 |
| 2013/0300069 A1 * | 11/2013 | Chang | ................... | B63H 23/321 277/550 |
| 2014/0145403 A1 * | 5/2014 | Lagler | ..................... | F16J 15/56 277/350 |
| 2018/0209544 A1 * | 7/2018 | Ko | ........................ | F16J 15/0887 |
| 2019/0076929 A1 * | 3/2019 | Ko | ........................ | F16J 15/188 |

FOREIGN PATENT DOCUMENTS

| | | |
|---|---|---|
| CN | 103775018 A | 5/2014 |
| CN | 108817421 A | 11/2018 |
| CN | 208138363 U | 11/2018 |
| CN | 109441745 A | 3/2019 |

\* cited by examiner

SHAFT-CYLINDER ASSEMBLY FOR HIGH TEMPERATURE OPERATION

CROSS-REFERENCES TO RELATED APPLICATIONS

This application is related to the U.S. patent application Ser. No. 13/405,239 filed Feb. 25, 2012; the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

FIELD OF THE INVENTION

The present disclosure relates generally to shaft-cylinder sealing technology and more specifically relates to sealing technology in a high-speed shaft-cylinder assembly working at high temperature environment.

BACKGROUND OF THE INVENTION

High-speed shaft-cylinder has been applied in various applications and equipment such as internal combustion engines, reciprocating pumps, gas compressors, and other similar assemblies wherein a rotary shaft or a piston shaft is the moving component contained by a cylinder and is made gas or fluid tight by seal rings.

The working temperature in some applications, such as internal combustion reciprocating engine, may reaches up to 1500 to 2000° C. The transient temperature at location between the seal and the shaft may even be higher due to the frictional energy induced by high speed movement. The extremely high temperature environment may cause failure of cylinder materials and oxidation of lubricating oil which result in shaft seizure. Furthermore, temperature variation over the engine may lead to a distortion of the engine components due to the thermal stresses. Cooling systems for internal combustion engines have been proposed, for example, in U.S. Pat. No. 4,539,942 wherein two cooling jackets with cooling fluid passages are configured on a cylinder head and cylinder block in an internal engine. However, such cooling configuration cannot effectively move the transient heat from the location between the seals and the shaft.

On the other hand, various sealing techniques have been proposed for high-speed operation. For example, brush seals basically formed by a multitude of flexible fine steel bristles tightly clamped between two plates have been used in a variety of high-speed rotating equipment. However, such type of seals may subject to leakage problem owning to pressure-stiffening, hysteresis or other undesired seal behavior. The leakage problem might be more serious in engines designed to have slightly barrel shaped cylinders which are for compensating the difference in severity of the scratching, and hence the different rate of erosion of the cylinder wall as a consequence.

SUMMARY OF THE INVENTION

It is an objective of the present invention to provide a shaft-cylinder assembly for high temperature operation, comprising a cooling configuration which can effectively move the transient heat from the location between the seals and the shaft such that distortion of engine components due to the thermal stresses caused by the temperature variation may be eliminated. It is a further objective of the present invention to provide shaft-cylinder assembly with lesser number of components, improved durability, reduced power loss due to reduced shaft-cylinder friction, and significantly reduced leakage.

In accordance with one aspect of the present invention, the shaft-cylinder assembly comprises: a cylinder; a shaft configured for moving in and along the cylinder; a dynamic sealing member configured to be in contact with the shaft for providing dynamic sealing function; and a cylindrical cooling jacket positioned between the dynamic sealing member and the cylinder, and configured to circumferentially surround the dynamic sealing member and be circumferentially surrounded by the cylinder; wherein the cooling jacket includes one or more cooling channels, each of the one or more cooling channels is configured to circulate a cooling fluid for moving heat away from the dynamic sealing member.

Alternatively, the shaft-cylinder assembly for high-temperature operation comprises a pair of first and second dynamic sealing members configured to be in contact with the shaft for providing dynamic sealing function; and a cylindrical cooling jacket configured to circumferentially surround the dynamic sealing members such that a cavity is defined between the dynamic sealing members inside the cooling jacket; wherein the cooling jacket comprises one or more inflow cooling channels and one or more outflow cooling channels configured to communicating with the cavity and circulating a cooling fluid through the cavity for moving heat away from the dynamic sealing members.

In accordance to another aspect of the present invention, the shaft-cylinder assembly further comprises one or more coiled felt seals (CFS) having a helical coiled seal ring structure which allows the CFS to contract when the shaft is travelling towards the upper end or lower end of the cylinder and dilate when the shaft end is travelling through the middle section of cylinder. Therefore, the tight contact between the CFS and the cylinder interior wall can be sustained during the up-down strokes of the shaft in the cylinder and leakage can be reduced to zero or close to zero.

BRIEF DESCRIPTION OF DRAWINGS

Embodiments of the invention are described in more detail hereinafter with reference to the drawings, in which.

DETAILED DESCRIPTION

Hereinafter, embodiments of the present invention will be described with reference to the figures. It should be noted that the embodiments described herein are not intended to limit the invention in accordance with the claims, and it is to be understood that each of the elements and combinations thereof described with respect to the embodiments are not strictly necessary to implement the aspects of the present invention. Additionally, well-known elements of the disclosure will not be described in detail or will be omitted so as not to obscure the relevant details of the disclosure.

Figure 1:
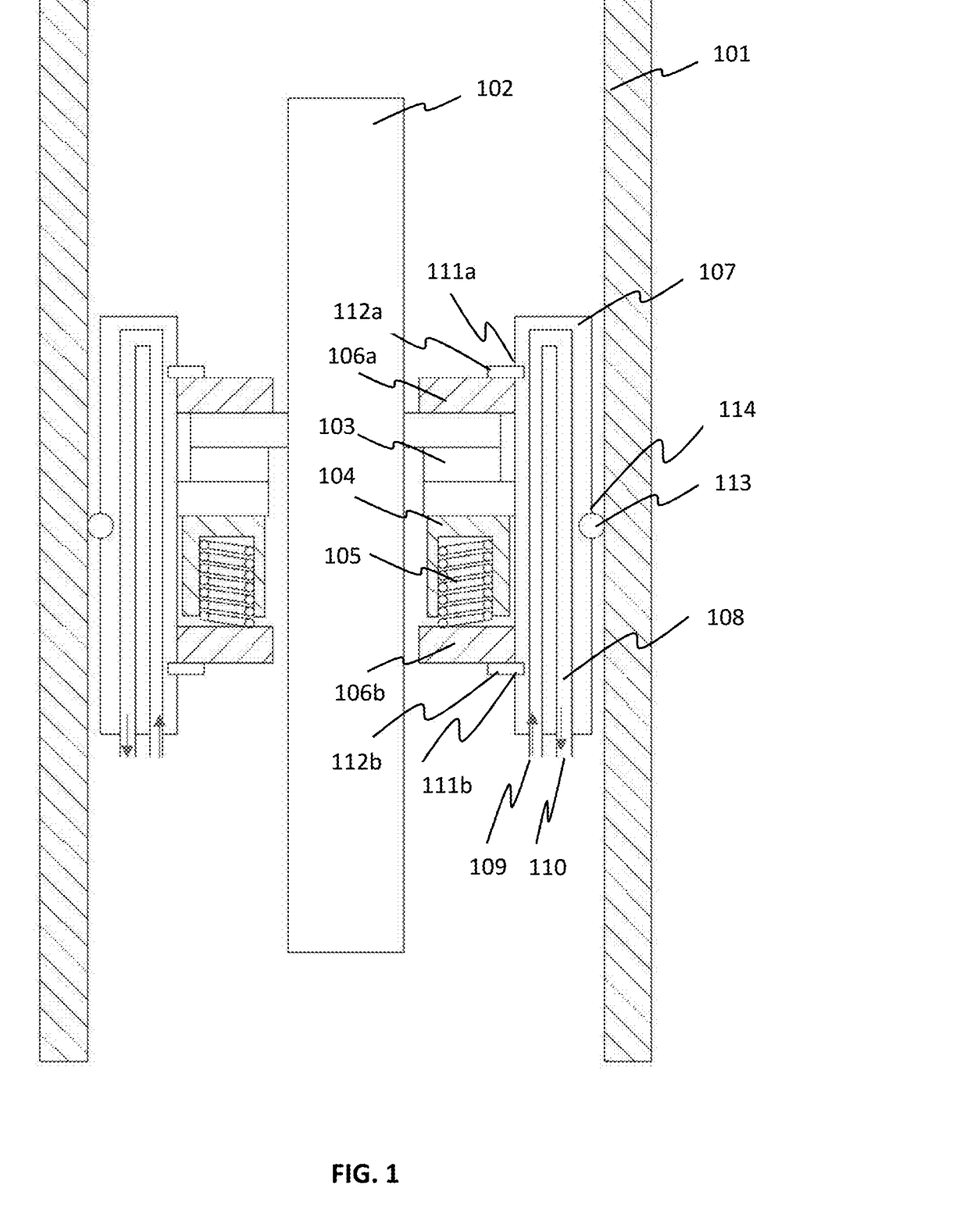
FIG. 1 depicts a sectional view of a shaft-cylinder assembly for in accordance with one embodiment of the present invention.

FIG. 1 depict a sectional view of a cylinder assembly 1 in accordance with one embodiment of the present invention. As show in FIG. 1, the cylinder assembly comprises a cylinder 101; a shaft 102 configured for moving in and along the cylinder 101; a dynamic sealing member 103 configured to be in contact with the shaft 102 for providing dynamic sealing function; a compression ring 104 engaged with a compression spring 105 configured for providing a pressing force on the dynamic sealing member 103 to keep the dynamic sealing member intimately in contact with the cylinder 101; a pair of first and second holding rings 106a and 106b for holding the dynamic sealing member 103 and the compression ring 104 inside the cooling jacket.

The cylinder assembly 1 may further comprise a cylindrical cooling jacket 107 positioned between the dynamic sealing member 103 and the cylinder 101. The cylindrical cooling jacket 107 is circumferentially surrounded by the cylinder 101 and in turn circumferentially surrounds the dynamic sealing member 103 and the compression ring 104. In some embodiments, the cooling jacket 107 may be configured to circumferentially surround the dynamic sealing member 103 only. The cooling jacket 107 may include one or more cooling channels 108, each of the cooling channels is configured for circulating of a cooling fluid, such as water, for moving heat away from the dynamic sealing member 103. Each of the cooling channels 108 may have an inlet 109 configured for receiving the cooling fluid and an outlet 110 configured for releasing the cooling fluid.

In accordance to various embodiments of the present invention, the inlet 109 and outlet 110 of the cooling channels 108 may be coupled to a circulation pump (not shown). The circulation pump may be driven by a pulley and belt from the crankshaft to drive heated fluid out from the outlet 110 to a heat exchanger, such as a radiator. The fluid is cooled in the radiator by the process of radiation. The cooled fluid then returns to the inlet 109 and flows back into the channel 108 again.

The cylindrical cooling jacket 107 may further comprise a pair of first and second snap ring grooves 111a and 111b formed on its interior wall and configured for engaging respectively with a pair of first and second snap rings 112a and 112b which are fastened to the pair of first and second holding rings 106a and 106b respectively for fixing the dynamic sealing member 103 and the compression ring 104 inside the cooling jacket 107.

In accordance to various embodiments of the present invention, the cooling jacket 107 may have an outer diameter slightly smaller than inner diameter of the cylinder 101 such that it is not in contact with the cylinder 101. The cylinder assembly may further comprise a static sealing ring 113 between the cooling jacket 107 and the cylinder 101 for providing sealing function. The static sealing ring 113 may have an inner diameter slightly smaller than the cooling jacket outer diameter so that it can encircle tightly around the cooling jacket 107 and seal it, whilst its outer diameter is slightly bigger than the cylinder inner diameter so that it pushes against interior wall of the cylinder 101 from all directions to seal it. In some embodiments, the cooling jacket 107 may have a ring groove 114 circumferentially formed on its outer wall for holding the static sealing ring on a fixed position around the cooling jacket 107.

Figure 2:
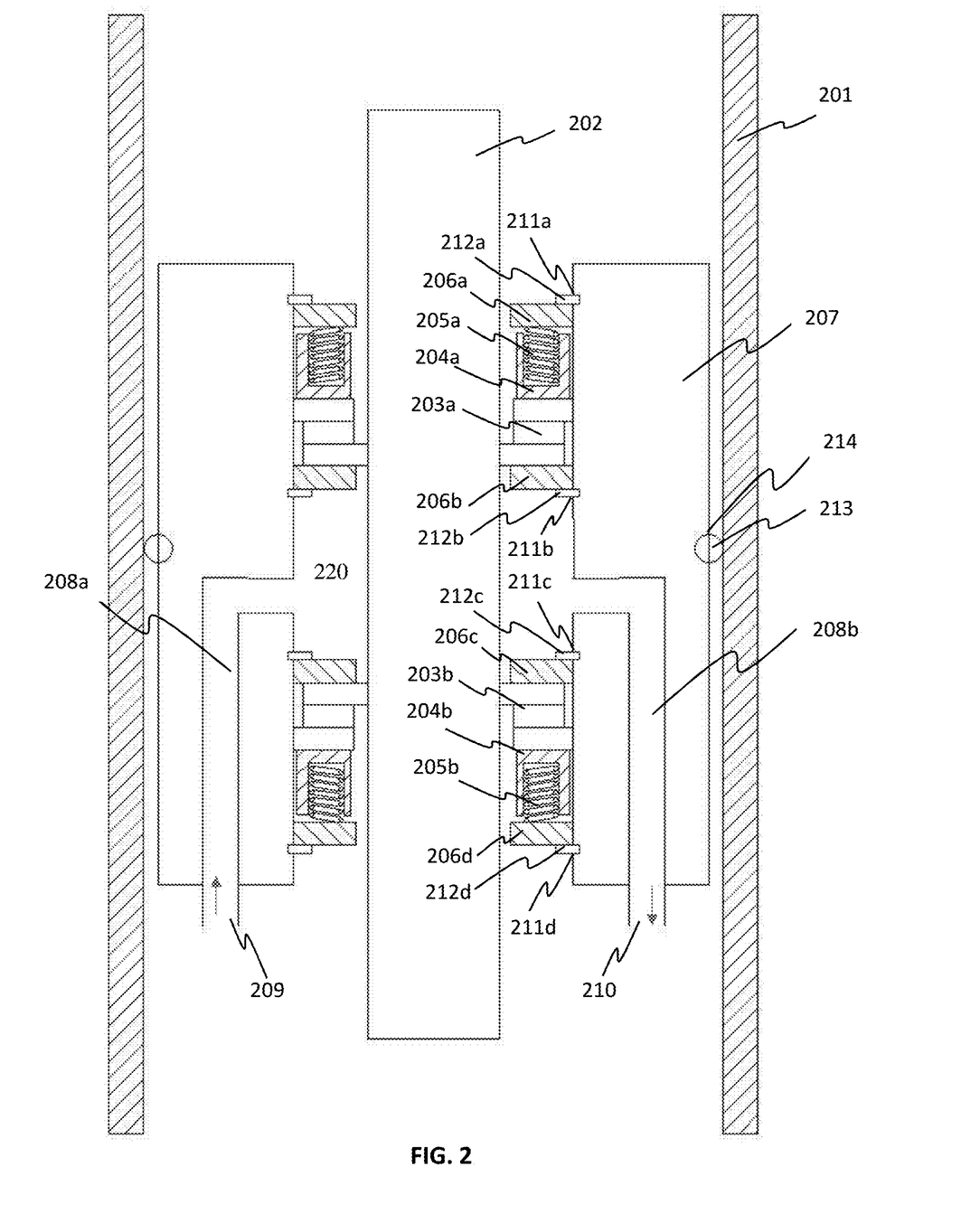
FIG. 2 depicts a sectional view of a shaft-cylinder assembly for in accordance with another embodiment of the present invention.

FIG. 2 depict a sectional view of a cylinder assembly 2 in accordance with another embodiment of the present invention. As show in FIG. 2, the cylinder assembly 2 comprises a cylinder 201; a shaft 202 configured for moving in and along the cylinder 201; a pair of first and second dynamic sealing members 203a and 203b configured to be in contact with the shaft 202 for providing dynamic sealing function.

The cylinder assembly 2 may further comprise a cylindrical cooling jacket 207 configured to circumferentially surround the dynamic sealing members 203a, 203b such that a cavity 220 is defined between the dynamic sealing members 203a, 203b inside the cooling jacket 207. The cooling jacket 207 may include one or more inflow cooling channels 208a and one or more outflow cooling channels 208b configured to communicating with the cavity 220 and circulating a cooling fluid, such as water, through the cavity 220 for moving heat away from the dynamic sealing members 203a, 203b. Each of the inflow cooling channels 208a may have an inlet 209 configured for directing the cooling fluid into the cavity 220 and each of the outflow cooling channels 208b may have an outlet 210 configured for directing the cooling fluid out from the cavity 220.

In accordance to various embodiments of the present invention, the inlet 209 and outlet 210 may be coupled to a circulation pump (not shown). The circulation pump may be driven by a pulley and belt from the crankshaft to drive the heated fluid out from the outlet 210 to a heat exchanger, such as a radiator. The fluid is cooled in the radiator by the process of radiation. The cooled fluid then returns to the inlet 209 and flows back into the cavity 220 again.

The cylinder assembly 2 may further comprise a pair of first and second compression rings 204a and 204b engaged with a pair of compression springs 205a and 205b configured for providing pressing forces on the pair of first and second dynamic sealing members 203a and 203b respectively to keep the dynamic sealing members intimately in contact with the cylinder 201.

The cylinder assembly 2 may further comprise a pair of first and second holding rings 206a and 206b for holding the first dynamic sealing member 203a and the first compression ring 204a inside the cooling jacket 207; and a pair of third and fourth holding rings 206c and 206d for holding the second dynamic sealing member 203b and the second compression ring 204b inside the cooling jacket 207.

The cylindrical cooling jacket 207 may further comprise a pair of first and second ring grooves 211a and 211b formed on its interior wall and configured for engaging respectively with a pair of first and second snap rings 212a and 212b which are fastened to the pair of first and second holding rings 206a and 206b respectively for fixing the first dynamic sealing member 203a and the first compression ring 204a inside the cooling jacket 207.

The cylindrical cooling jacket 207 may further comprise a pair of third and fourth ring grooves 211c and 211d formed on its interior wall and configured for engaging respectively with a pair of third and fourth snap rings 212c and 212d which are fastened to the pair of third and fourth holding rings 206c and 206d respectively for fixing the second dynamic sealing member 203b and the second compression ring 204a inside the cooling jacket 207.

In accordance to various embodiments of the present invention, the cooling jacket 207 may have an outer diameter slightly smaller than inner diameter of the cylinder 201 such that it is not in contact with the cylinder. The cylinder assembly may further comprise a static sealing ring 213 between the cooling jacket 207 and the cylinder 201 for providing sealing function. The static sealing ring 213 may have an inner diameter slightly smaller than the cooling jacket outer diameter so that it can encircle tightly around the cooling jacket 207 and seal it, whilst its outer diameter is slightly bigger than the cylinder inner diameter so that it pushes against interior wall of the cylinder 201 from all directions to seal it. In some embodiments, the cooling jacket 207 may have a ring groove 214 circumferentially formed on its outer wall for holding the sealing ring on a fixed position around the cooling jacket 207.

In accordance to various embodiments of the present invention, the dynamic sealing members may be a coiled felt seal (CFS) formed by assembling a plurality of metal dynamic sealing rings which have a helical coiled seal ring structure as disclosed in the PCT International Application No. PCT/CN2012/071634.

Figure 3:
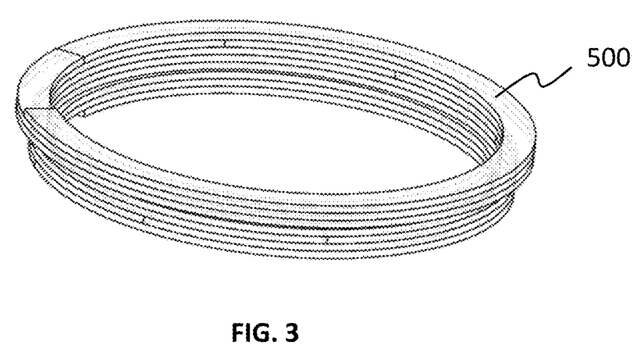
FIG. 3 shows a CFS in accordance with one embodiment of the present invention.
Figure 4:
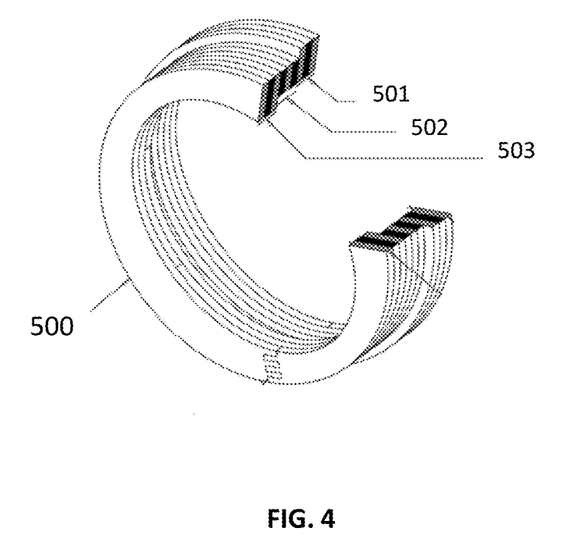
FIG. 4 shows a partial cutaway view of the CFS in accordance with one embodiment of the present invention.
Figure 5A:
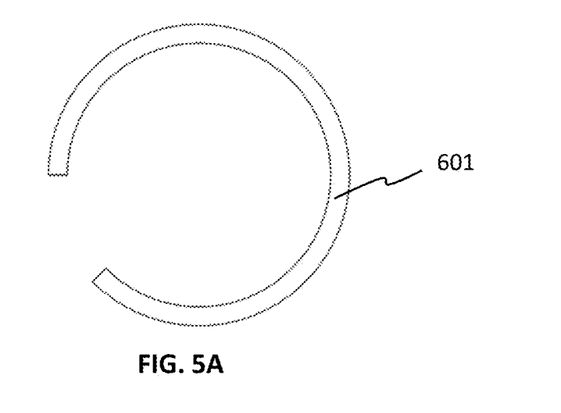
FIG. 5A shows a cylinder seal ring in accordance with one embodiment of the present invention.
Figure 5B:
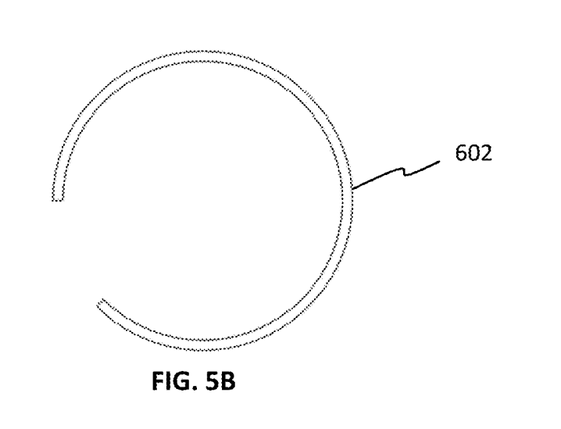
FIG. 5B shows a displacement absorption ring in accordance with one embodiment of the present invention.
Figure 5C:
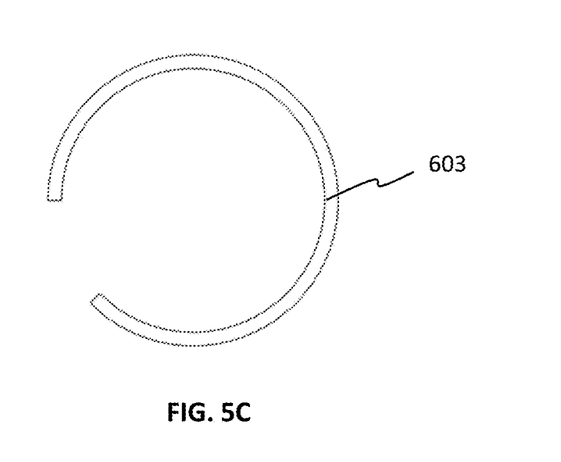
FIG. 5C shows a shaft seal ring in accordance with one embodiment of the present invention.

FIGS. 3 and 4 show an isometric view and a partial cutaway view, respectively, of a CFS 500 in accordance with one embodiment of the present invention. As shown in FIG. 4, the CFS 500 has three different functioned layers: cylinder seal layer 501, displacement absorption layer 502 and shaft seal layer 503. The functional layers may be formed by groups of their corresponding basic source rings. FIGS. 5A-5C shows three types of C-shaped basic source rings: cylinder seal rings 601 for forming the cylinder seal layer 601, displacement absorption rings 602 for forming the displacement absorption layer 502 and shaft seal rings 603 for forming the shaft seal layer 503, respectively.

The function of the cylinder seal layer 501 is for blocking the leak between inside diameter of the cylinder 1 and CFS 500. The corresponding cylinder seal rings 601 have outer diameter slightly bigger than the cylinder inner diameter so that they push against the cylinder interior wall from all directions to seal it, whilst their inner diameter is bigger than the shaft diameter that they never touch the shaft surface.

The displacement absorption layer 502 is built between the cylinder seal layer 501 and the shaft seal layer 503 to absorb eccentric vibration of the shaft and also absorbs the dimensional change of the whole system by wearing along with use. The corresponding displacement absorption rings have inner diameter bigger than the shaft diameter so they never touch the shaft surface, whilst their outer diameter is smaller than the cylinder inner diameter so that they never touch the cylinder interior wall.

The function of the shaft seal layer is blocking the leak between outside diameter of the shaft 2 and CFS 500. The corresponding shaft seal rings 603 have inner diameter slightly smaller than shaft diameter so that they can encircle tightly around the shaft sealing block surface and seal it, whilst their outer diameter is sharing the same outer diameter of the displacement absorption rings, which is smaller than the cylinder inner diameter such that they never touch the cylinder interior wall.

The displacement absorption rings of the CFS allow big tolerance of misalignments in the shaft-cylinder assembly because the rings in this section are movable in the latitudinal directions, swinging around to absorb vibrations and lateral movements caused by the misalignments between the shaft and the cylinder under high speed up-down stroke motion. As such, the presence of the displacement absorption section ring in the CFS also reduces the unwanted torque due to misalignment among the center of the shaft.

Figure 6:
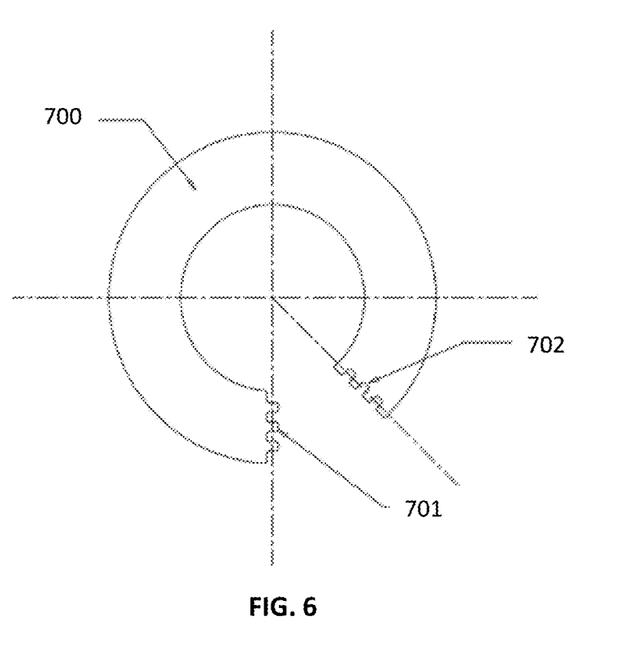
FIG. 6 shows a C-shaped basic source ring in accordance to one embodiment of the present invention.

FIG. 6 shows a C-shaped basic source ring 700 which is a partial ring with a pair of male dovetail 701 and female dovetail 702 in accordance to one embodiment of the present invention. The C-shaped ring may be stamped out by press or fabricated by contour cutting process such as laser cutting or wire cutting from sheet stock to have two faces in perfect parallel. As shown in FIG. 13, the C-shaped basic source ring 700 is a partial ring that made to have a part of the ring cut away so as to make the partial rings be progressively joined by the male dovetail 701 and female dovetail 702 made on two ends of the partial ring. The value of the cut away angle should be determined accordingly along with diameter.

Figure 7:
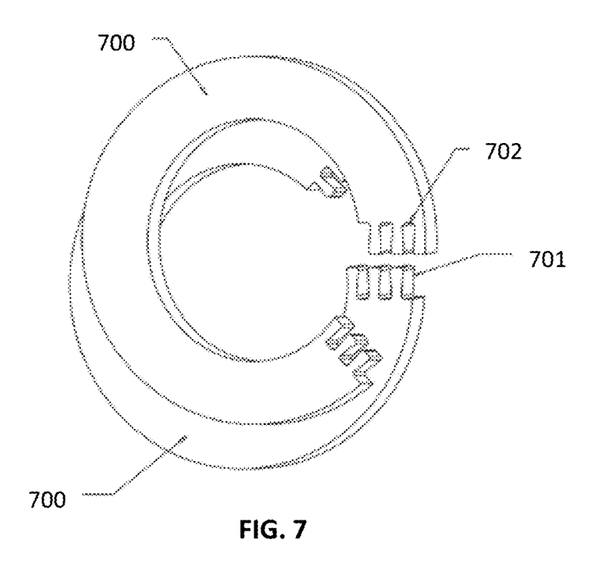
FIG. 7 shows a method of progressive joining of two C-shaped basic source rings in accordance to one embodiment of the present invention.

FIG. 7 shows the method of progressive joining of two C-shaped basic source rings 700 by the male dovetail 701 of first partial ring 700 and female dovetail 702 of next partial ring 700.

Because each C-shaped ring is only a partial circle, in order to provide effective sealing function, a minimum of two shaft seal rings, a minimum number of two-cylinder seal rings and at least one displacement absorption ring is needed to form a complete CFS.

The helical coiled seal ring structure of the CFS can assure perfect sealing performance. It allows the CFS to contract when the shaft sealing block is travelling towards the upper end or lower end of the cylinder and dilate when the shaft sealing block is travelling through the middle section of cylinder. Therefore, the tight contact between the CFS and the cylinder interior wall can be sustained during the up-down strokes of the shaft in the cylinder and leakage can be reduced to zero or close to zero.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A shaft-cylinder assembly, comprising:
   a cylinder;
   a shaft configured for moving in and along the cylinder;
   a pair of first and second dynamic sealing members configured to be in contact with the shaft for providing dynamic sealing function;
   a cylindrical cooling jacket configured to circumferentially surround the dynamic sealing members such that a cavity is defined between the dynamic sealing members inside the cooling jacket;
   a pair of first and second compression rings engaged with a pair of compression springs configured for providing pressing forces on the pair of first and second dynamic sealing members respectively to keep the first and second dynamic sealing members intimately in contact with the cylinder;

a pair of first and second holding rings for holding the first dynamic sealing member and the first compression ring inside the cooling jacket;

a pair of third and fourth holding rings for holding the second dynamic sealing member and the second compression ring inside the cooling jacket;

a pair of first and second ring grooves formed on an interior wall of the cylindrical cooling jacket and configured for engaging respectively with a pair of first and second snap rings which are fastened to the pair of first and second holding rings respectively for fixing the first dynamic sealing member and the first compression ring inside the cooling jacket; and a pair of third and fourth ring grooves formed on the interior wall of the cylindrical cooling jacket and configured for engaging respectively with a pair of third and fourth snap rings which are fastened to the pair of third and fourth holding rings respectively for fixing the second dynamic sealing member and the second compression ring inside the cooling jacket;

wherein the cooling jacket consists of a single inflow cooling channel and a single outflow cooling channel configured to communicating with the cavity and circulating a cooling fluid through the cavity for moving heat away from the dynamic sealing members; and wherein the cavity is in direct contact with the shaft such that the single inflow cooling channel and the single outflow cooling channel are in direct communication with the shaft.

2. The shaft-cylinder assembly of claim 1, wherein the inflow cooling channel has an inlet configured for directing the cooling fluid into the cavity and the outflow cooling channel has an outlet configured for directing the cooling fluid out from the cavity.

3. The shaft-cylinder assembly of claim 1, further comprising a static sealing ring between the cooling jacket and the cylinder for providing sealing function; and wherein the static sealing ring is fixed around the cooling jacket.

4. The shaft-cylinder assembly of claim 1, wherein each of the first and second dynamic sealing members has a helical coiled seal ring.

* * * * *